I. SHOENBERG.
METHOD FOR MULTIPLYING THE FREQUENCY OF ELECTRIC CURRENTS.
APPLICATION FILED DEC. 27, 1917.

1,269,011.

Patented June 11, 1918.
3 SHEETS—SHEET 1.

Inventor
Isaac Shoenberg
By
Shuffield & Betts
Attorneys

I. SHOENBERG.
METHOD FOR MULTIPLYING THE FREQUENCY OF ELECTRIC CURRENTS.
APPLICATION FILED DEC. 27, 1917.

1,269,011.

Patented June 11, 1918.
3 SHEETS—SHEET 2.

Inventor
Isaac Shoenberg
By his Attorneys
Sheffield & Betts

I. SHOENBERG.
METHOD FOR MULTIPLYING THE FREQUENCY OF ELECTRIC CURRENTS.
APPLICATION FILED DEC. 27, 1917.

1,269,011.

Patented June 11, 1918.
3 SHEETS—SHEET 3.

Inventor
Isaac Shoenberg
By his Attorneys
Sheffield & Betts

UNITED STATES PATENT OFFICE.

ISAAC SHOENBERG, OF LONDON, ENGLAND, ASSIGNOR TO MARCONI WIRELESS TELEGRAPH COMPANY OF AMERICA, OF NEW YORK, N. Y., A CORPORATION OF NEW JERSEY.

METHOD FOR MULTIPLYING THE FREQUENCY OF ELECTRIC CURRENTS.

1,269,011.   Specification of Letters Patent.   Patented June 11, 1918.

Application filed December 27, 1917. Serial No. 209,197.

*To all whom it may concern:*

Be it known that I, ISAAC SHOENBERG, a Russian subject, residing at Marconi House, Strand, London, England, have invented a new and useful Improved Method for Multiplying the Frequency of Electric Currents, of which the following is a specification.

This invention relates to a method of multiplying the frequency of electric currents.

This invention is based on the following principle:—If one of the mains from a source of alternating current includes a coil upon an iron core in which are no air gaps or at most very small ones, and which has a second winding in circuit with a source of direct current, and a choking coil with an open core, the curves for the current and voltage in the mains will possess the peculiarity that the amplitude on one side is much larger than that on the other, while that portion of the period which corresponds to the larger amplitude is smaller than the portion corresponding to the smaller amplitude, the ratio of the one portion to the other being a function of the ampere turns of the two windings.

Each phase of a supply of $n$ phases is therefore treated in this way, so arranging the ampere turns of the windings that the said ratio shall be equal to $1/n$, and the $n$ currents are combined, thus obtaining a current of a frequency $n$ times that of the fundamental.

When $n$ is large, in order to avoid the use of a multiphase generator of the ordinary type which might be inconvenient, a phase transformer may be used consisting of an iron core, in which a rotating field is created, and around which coils are spaced in such a way as to get the necessary phase difference, as described in my application for Patent No. 124251, lodged 7th. October, 1916.

Figure 1:
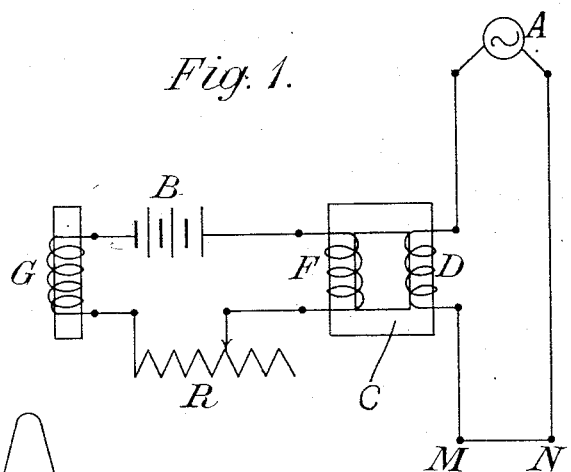

This invention is illustrated by the accompanying diagrams. Figure 1 shows the arrangement of apparatus for producing from an alternator a current with a curve such as is shown in Fig. 2, while the thick line in Fig. 3 represents the current obtained from a four phase supply and having four times its frequency.

Figure 3:
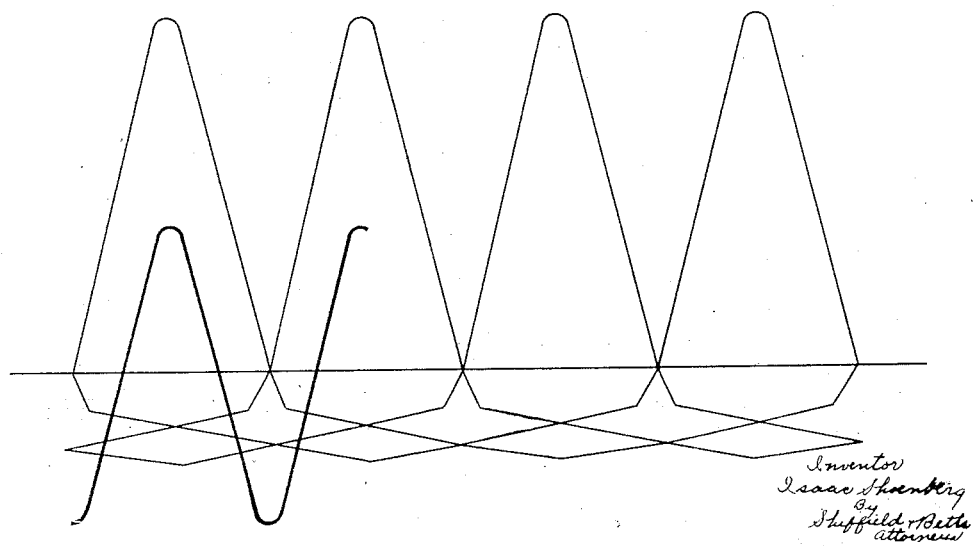
Figure 4:
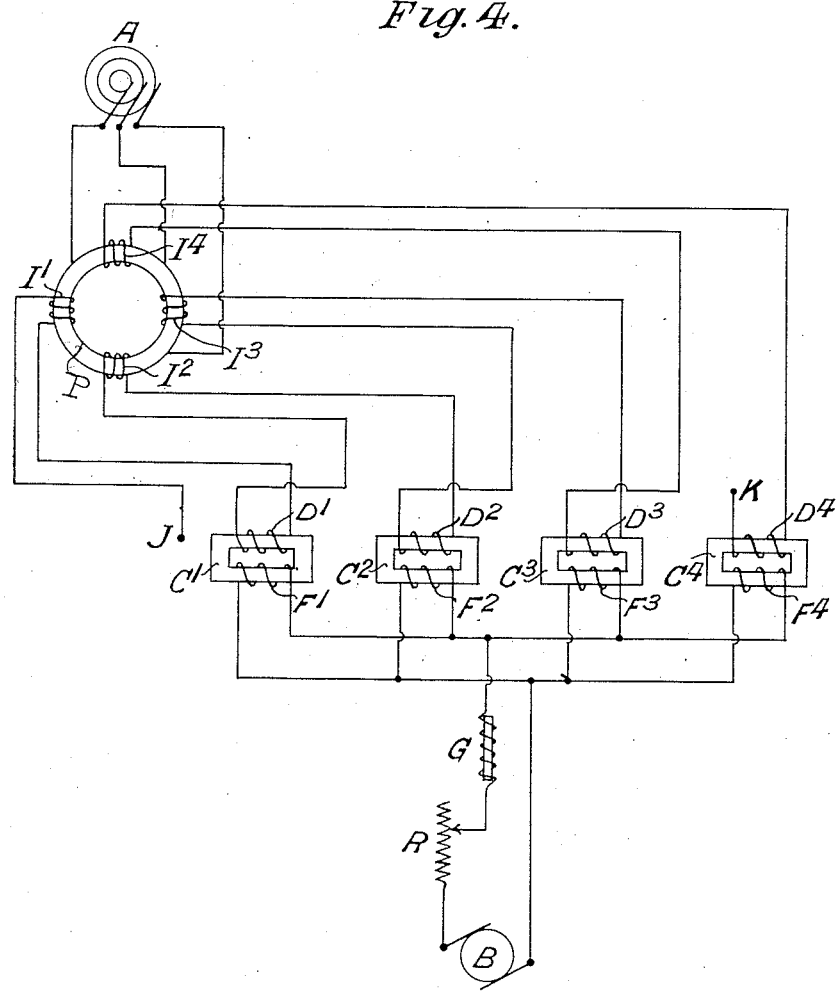
Figure 5:
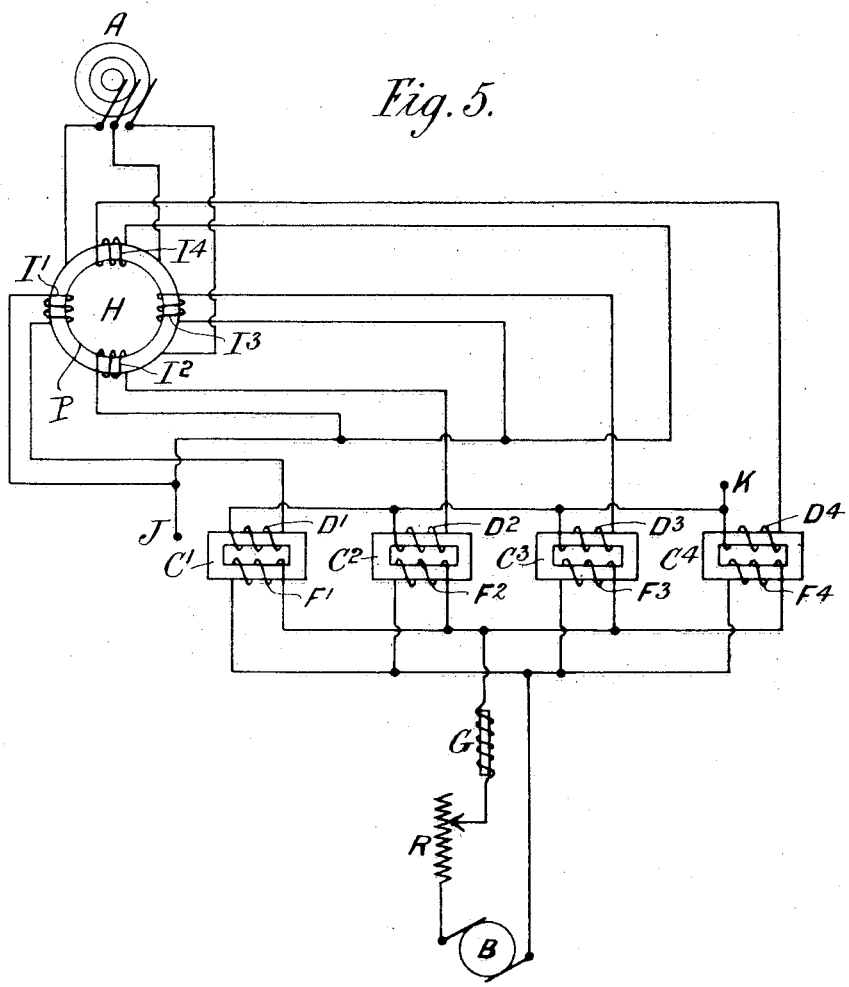

Figs. 4 and 5 are diagrammatic views showing the connections and arrangement of apparatus for producing the relation of current waves shown in Fig. 3, the phases being in series and in parallel respectively in Figs. 4 and 5.

In Fig. 1, A is a source of alternating current, C is an iron core with no gaps, or with very small ones, and on this core are placed two windings; the one D is inserted in one of the mains from A, while the other F is connected to a source B of direct current through an adjustable resistance R and a choking coil G having an open core so that the core C can be saturated.

Figure 2:
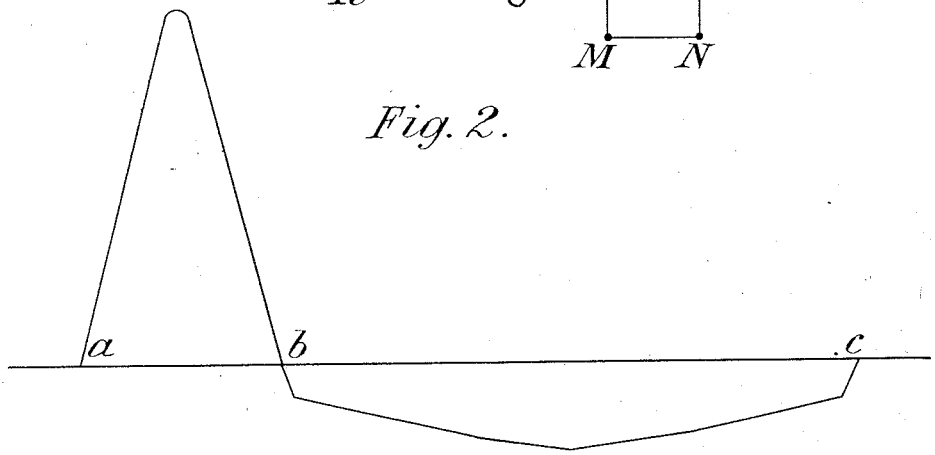

The curves for the current or voltage between the points M, N, of the main will be of the form shown in Fig. 2. In this figure $a\,c$ corresponds to a full period, the amplitude on one side is much larger than on the other and the part $a\,b$ is much smaller than half a period. The ratio $1/n = a\,b/a\,c$ is a function of the ratio of the ampere turns in D and F.

If a similar arrangement is therefore introduced into each of the phases of a supply of $n$ phases and the currents in the several phases are added, a current is obtained of a frequency $n$ times that of the fundamental, as shown in Fig. 3, for the case of a four phase supply.

Referring to Figs. 4 and 5, these figures show the details of an arrangement where $n$ is four. The ultimate source of current is shown at A in both Figs. 4 and 5, A being a three phase alternator. Machine A is connected to a phase transformer having a circular core after the manner of British Patent No. 14,423 of 1915, the primary coils being omitted for purposes of illustration. $I^1$, $I^2$, $I^3$ and $I^4$ are four secondary coils on the said core spaced 90° apart. Owing to the rotating field produced in said core by the primary currents, said secondary coils produce currents ninety degrees apart. In one lead of each of the secondary coils are choking coils $D^1$, $D^2$, $D^3$ and $D^4$ respectively, wound on the corresponding closed cores $C^1$, $C^2$, $C^3$ and $C^4$. The cores of the choking coils are saturated by current in coils $F^1$, $F^2$, $F^3$ and $F^4$, supplied by the continuous current source B. Current regulating resistance R and choking coil G are in series with coils $F^1$, $F^2$, $F^3$ and $F^4$. When the current in coils $F^1$, $F^2$, $F^3$ and $F^4$ is properly adjusted, the currents from coils I¹, I², I³ and I⁴ assume the relationship shown in Fig. 8. The multiple frequency current is taken off between the points J and K. It will be observed that the phases are directly added without the employment of transformers.

What I claim is:—

1. An apparatus for increasing the frequency of a multiphase current comprising coils having iron cores of low reluctance connected into one lead of each phase, a winding for continuous current on each of said cores, and means for supplying current to said winding, the ratio between the continuous current ampere turns and the alternating current ampere turns being such that the current wave of each phase is increased in amplitude and decreased in duration on one side of the zero line to such extent that the portion of increased amplitude is an integral fraction of the fundamental frequency, the phases being directly connected in such manner that the portions of the current waves of increased amplitude all lie on the same side of the zero line.

2. An apparatus for increasing the frequency of a multiphase current comprising a coil having an iron core of low reluctance connected into one lead of each phase, a winding for continuous current on each of said cores, means for supplying current to said windings, and a choking coil having a core with open magnetic circuit in series with each of said windings, the ratio between the continuous current ampere turns and the alternating current ampere turns being such that the current wave of each phase is increased in amplitude and decreased in duration on one side of the zero line to such extent that the portion of increased amplitude is an integral fraction of the fundamental frequency, the phases being directly connected in such manner that the portions of the current waves of increased amplitude all lie on the same side of the zero line.

3. The method of obtaining a relatively high frequency current from $n$ currents of different phase having a common lower frequency, which consists in increasing the amplitude and decreasing the duration of one part of the current wave of each of said currents and directly combining the resulting currents with non-magnetic connections to give a single alternating current of $n$ times the frequency of the original currents.

4. The method of obtaining a relatively high frequency current from a plurality of currents of different phase having a common lower frequency consisting in deforming the wave shape of each phase in such manner as to increase the amplitude and decrease the duration of the part of the wave on one side of the zero line as compared to the other part, so that the portions of increased amplitude are reduced to integral fractions of a complete cycle, and connecting the phases so that the portions of the currents of increased amplitude all lie on the same side of the zero line in immediate succession.

5. The method of obtaining a relatively high frequency current from a plurality of currents of different phase having a common lower frequency, which consists in deforming the wave shape of said currents in such manner as to increase the amplitude and decrease the duration of the part of the wave on one side of the zero line as compared to the other part, and directly combining the deformed waves to give a current of increased frequency.

6. The method of obtaining a relatively high frequency current from a plurality of currents of different phase of a lower common frequency, which consists in deforming the wave shape of each of said currents by inserting therein a transformer having an iron core and having a magnetic circuit of low reluctance, magnetizing said transformer by a continuous current, and directly combining the distorted currents to give a current of high frequency.

7. An apparatus for increasing the frequency of a multiphase alternating current, comprising in combination a coil connected into each phase of said source, saturated cores of low magnetic reluctance for said coils, and a winding for each core connected to a source of continuous current for saturating the core, the phases being directly connected and the ratio of continuous current ampere turns to alternating current ampere turns being such that the resulting frequency is equal to the original frequency multiplied by the number of phases.

8. An apparatus for increasing the frequency of a multiphase alternating current comprising in combination a coil connected into each phase of said source, saturated cores for said coils of low magnetic reluctance, and a winding for each core connected to a source of continuous current for saturating the core, the number of phases and coils as well as the ratio of the continuous current and alternating current ampere turns being so arranged as to enable the phases to be directly added and to give the desired multiple of the fundamental frequency.

9. The method of increasing the frequency of a multiphase current of sine wave shape, which consists in deforming the wave shape of the current in each phase so that the portion of the wave on one side of the zero line is increased in amplitude and decreased in duration to an integral fraction of a complete cycle of the source of supply and combining said deformed waves so that said portions of increased amplitude all lie on one side of the zero line in immediate succession with their zero points substantially coinciding and the resulting current wave is substantially of equal amplitude on both sides of the zero line and is substantially of sine form, and so that the frequency of the resulting current is equal to the original frequency multiplied by the number of phases.

In testimony that I claim the foregoing as my invention, I have signed my name this tenth day of December, 1917.

ISAAC SHOENBERG.